E. J. BRANDT.
COIN DELIVERY MACHINE.
APPLICATION FILED AUG. 14, 1911.

1,068,307.

Patented July 22, 1913.
8 SHEETS—SHEET 2.

E. J. BRANDT.
COIN DELIVERY MACHINE.
APPLICATION FILED AUG. 14, 1911.

1,068,307.

Patented July 22, 1913.

E. J. BRANDT.
COIN DELIVERY MACHINE.
APPLICATION FILED AUG. 14, 1911.

1,068,307.

Patented July 22, 1913.
8 SHEETS—SHEET 8.

UNITED STATES PATENT OFFICE.

EDWARD J. BRANDT, OF WATERTOWN, WISCONSIN, ASSIGNOR TO BRANDT CASHIER COMPANY, OF CHICAGO, ILLINOIS.

COIN-DELIVERY MACHINE.

1,068,307. Specification of Letters Patent. Patented July 22, 1913.

Application filed August 14, 1911. Serial No. 643,980.

*To all whom it may concern:*

Be it known that I, EDWARD J. BRANDT, a citizen of the United States, and resident of Watertown, in the county of Jefferson and State of Wisconsin, have invented certain new and useful Improvements in Coin-Delivery Machines; and I do hereby declare that the following is a full, clear, and exact description thereof.

The invention relates to an improvement in coin delivery machines, its objects being to simplify construction, lessen cost of manufacture and provide compact durably organized and efficient coin-delivery machines of the type now generally known as " Brandt automatic cashiers," the improved machine herein disclosed being analogous in some features to the one set forth in prior Patent No. 923,013, of May 25, 1909, and others to which the same refers.

Fig. 7, a plan view of a fragment of the machine inverted and partly broken away; Fig. 8, a sectional view of a detail of the machine, this view being indicated by line 8—8 in Fig. 7; Fig. 9, a side elevation of a detail of the machine partly in section; Fig. 10, a sectional view indicated by line 10—10 in Fig. 9.

The herein described machine is a combination of what is known as a payer and a changer machine, and said machine is schemed to employ but fifty-four actuating keys for mechanism for the ejectment of coin in value from one cent to one dollar of United States money, whereas it has heretofore been the practice to employ one-hundred push-keys for the same purpose in either a paying or changing machine. Another such-key is employed to actuate mechanism that effects ejectment of dollars from the coin-tray, and other push devices are employed to operate mechanism that prevents the ejectment from said tray of twenty-five and fifty cent coins in various combinations, when change out of twenty-five, fifty or seventy-five cents is to be made by an operation of one or a pair of the aforesaid push-keys. The improved machine is also organized to provide for trapping coin in the delivery chute for the same, and it also includes a single spring-controlled rocker in the path of each of a series of spring - suspended coin - pusher rockers. The rocker first aforesaid is hereinafter designated by the term " universal rocker " and its function is to return any depressed coin-pusher rocker or rockers to normal position upon release of an actuating key or keys for the same, the spring in connection with each coin-pusher rocker being only of sufficient normal tension to prevent fall of said rocker when said universal rocker is moved away from the same, or in other words when that particular coin-pusher rocker is not involved in a coin-delivery operation.

Each coin-pusher is put in spring-controlled pivotal connection with a sliding carrier attached to a lever-arm of one of the spring - suspended rockers, this and other novel features of the improved machine being hereinafter described in detail.

Figure 1:
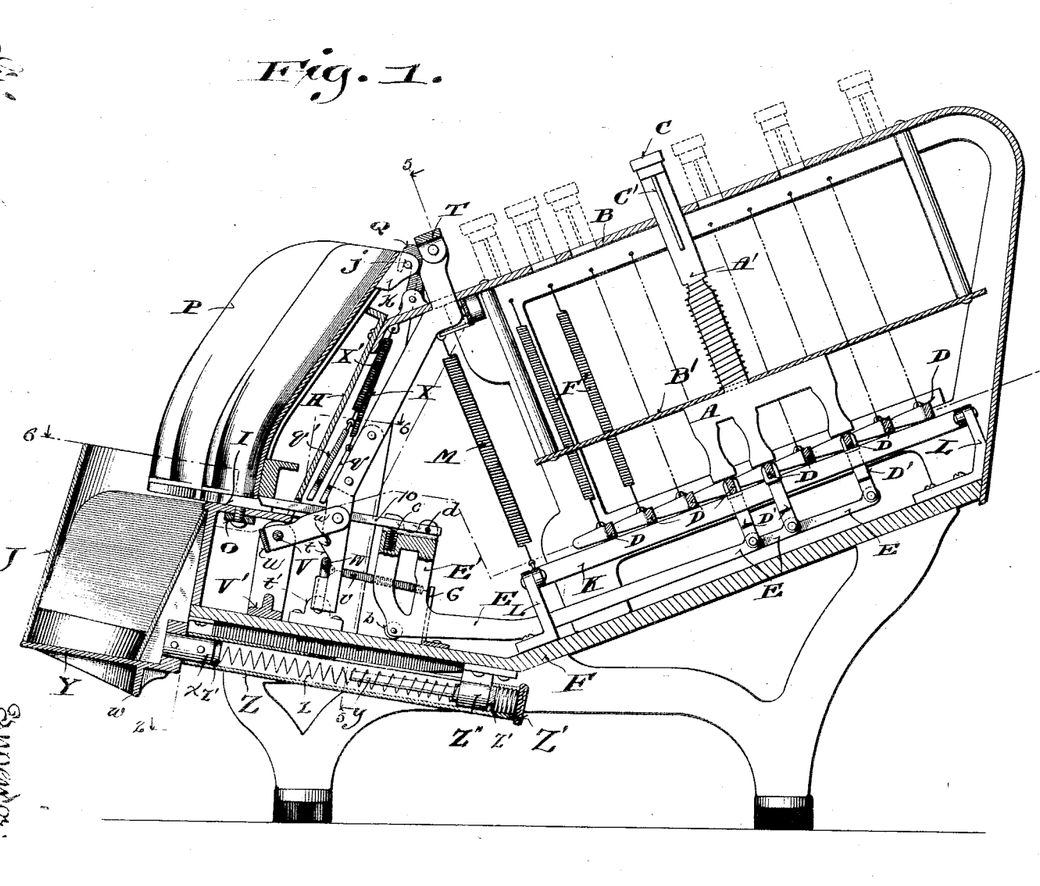
Figure 1 of the drawings represents a vertical longitudinal section view of my improved coin-delivery machine, this view being indicated by line 1—1 in the second figure of the series.
Figure 2:
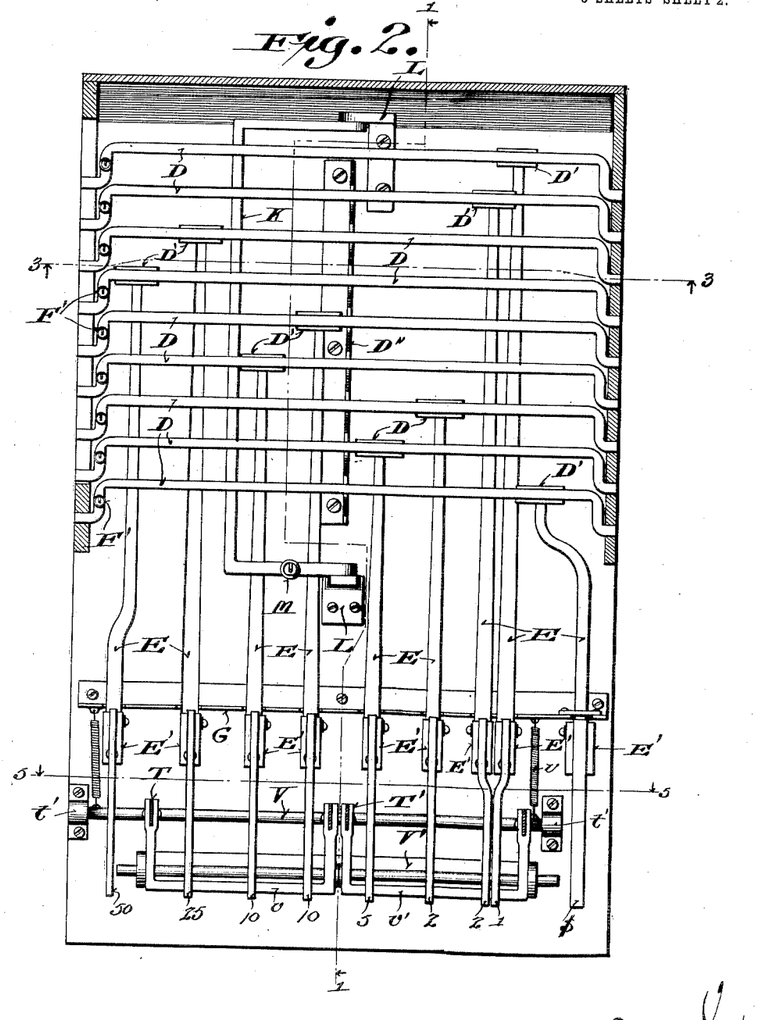
Fig. 2, a horizontal section view of the major portion of the machine, the same being indicated by line 2—2 in Fig. 1.
Figure 3:
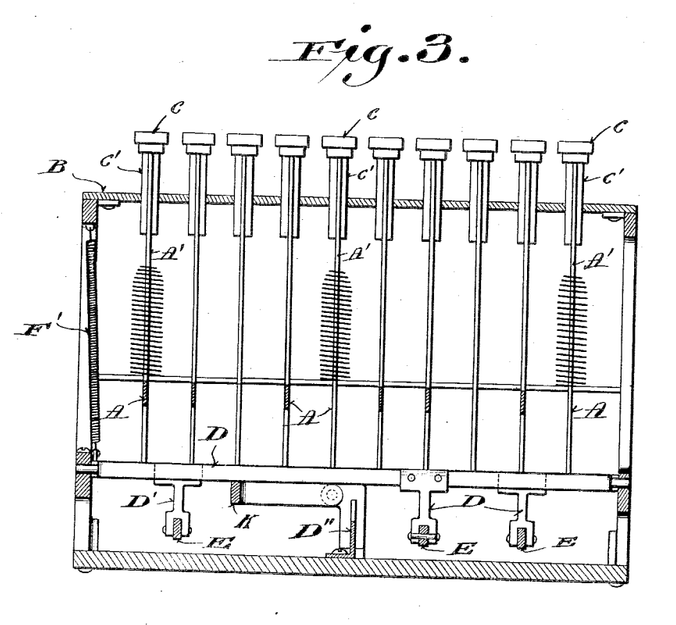
Fig. 3, a transverse section view of the machine indicated by line 3—3 in Fig. 2.

Referring by letters, numerals and otherwise to the drawings, A in Fig. 1, indicates one of a series of vertically reciprocative edgewise plates, such as are usually employed in "Brandt automatic cashiers," each of said plates being provided with a spring-controlled shank A' guided in a slotted top B of the machine casing and in a slotted plate B' suspended from said casing-top. The shank aforesaid is in connection with the shank C' of a push-button C and the push-button shank is guided in the top of said casing. Each edgewise plate and push-button therewith constitutes what is herein termed a "key" of the machine, its preferred construction, as thus far disclosed, having been heretofore set forth in Patent No. 824,841, of July 3, 1906.

The present construction of casing and the arrangement of the various parts differ from the construction shown in the above mentioned patent in the following essential particulars: The back portion of the machine or casing in which the keys are arranged is preferably made so that it will assume an inclined position, as shown more particularly in Fig. 1, while the forward portion of the casing where the coin tray and the pushers, presently to be described, are located, is arranged at a different inclination. One of the advantages of this arrangement may be stated to be that the coins are positioned in substantially vertical piles, so that they may be fed by gravity while the keys are arranged at an incline, thus exposing the numbers which are placed on the top of the keys to the full view of the operator, who usually is positioned in front of the machine. With this arrangement, the keys are arranged at an incline and all the parts adjacent thereto are properly fashioned and associated for ready operation. This is a material advantage over what has heretofore been known as the flat type of machine. A further advantage of the construction of the inclined back portion is that it affords full clearance below the machine and in other ways renders the machine more compact and advantageously arranged for operation. As is also usual in "Brandt automatic cashiers," the plate portion of each key is provided with a foot or feet, and each foot rests on one of a series of transverse rockers, each rocker D being cranked at both ends and journaled in the sides of the frame-work of the machine. Like in the patent first aforesaid, the rockers are suspended in the machine by spiral-springs F' attached to said framework, and each rocker is provided with a supplemental crank D', the same constituting what is herein termed the "lever-arm" of said rocker. To limit downward swing of the rockers, an upwardly notched stop-plate D'' is made fast on the casing-bottom F aforesaid.

Figures 7, 8, 9, 10:
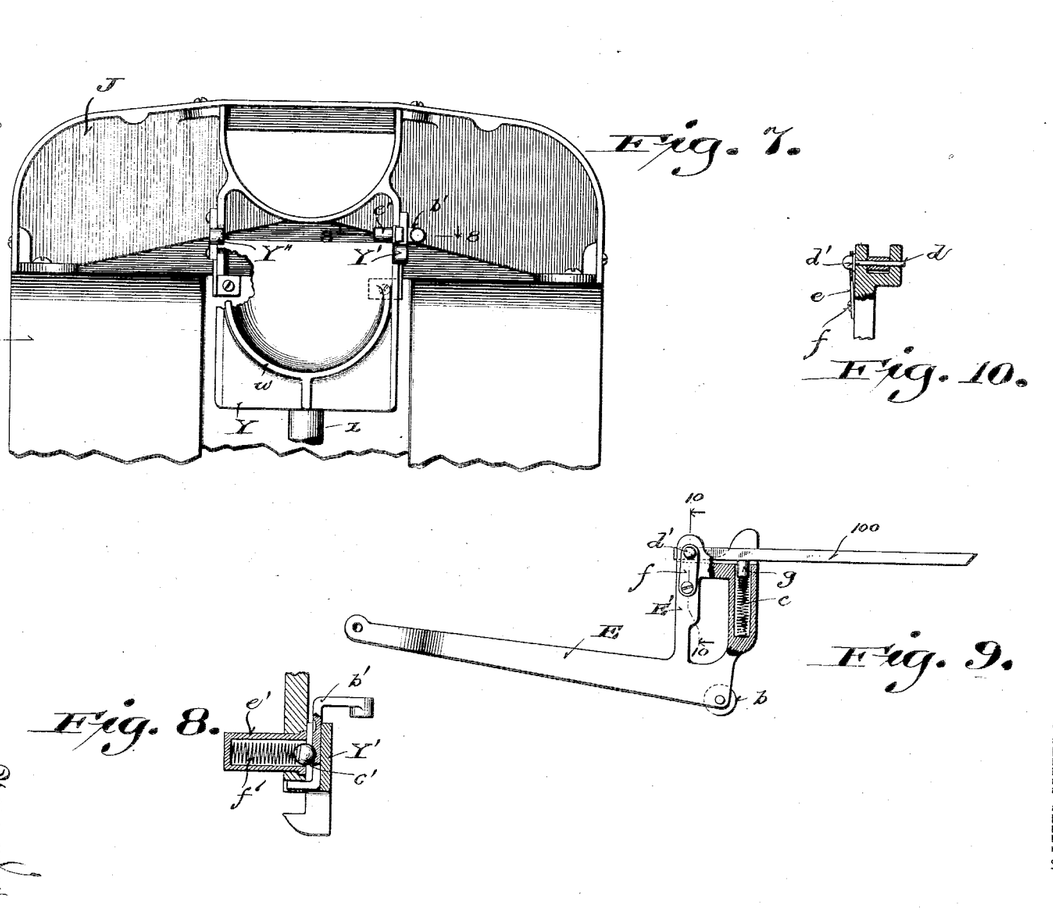
Figures 11, 12:
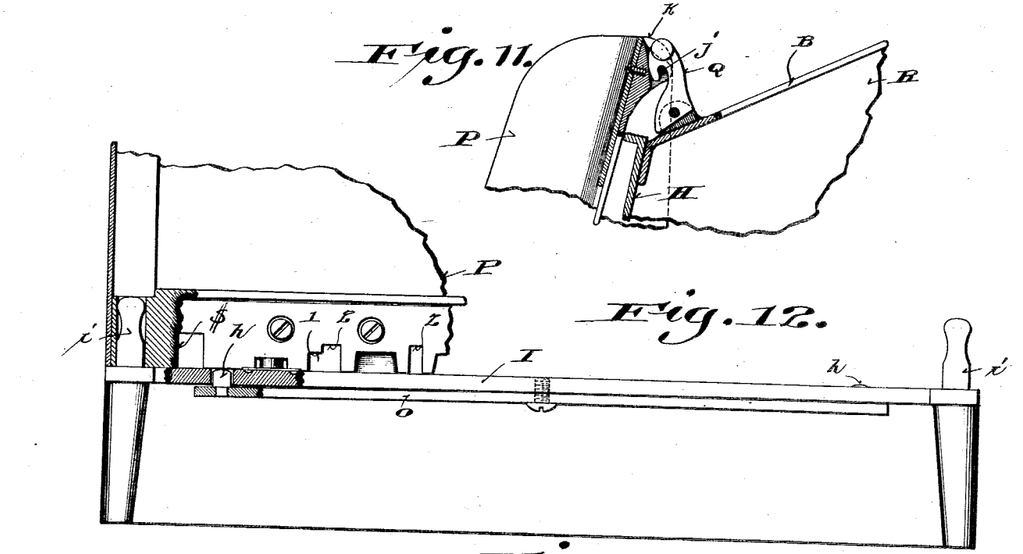
Fig. 11, a partly sectional side elevation of a detail of the machine.
Fig. 12, a partly sectional rear elevation of a detail of the machine.
Figure 13:
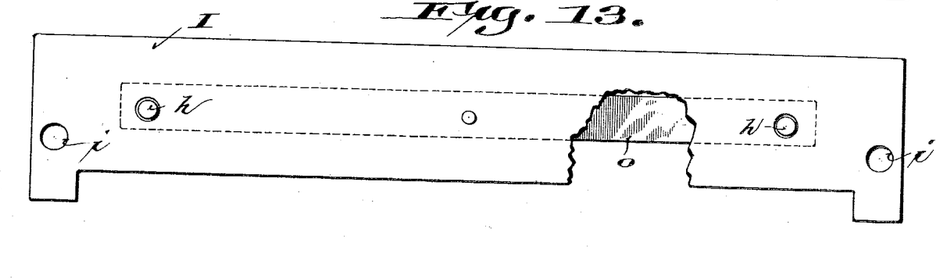
Fig. 13, a plan view of a detail of the machine partly broken away.

Pivotally connected to the lever-arm of each rocker is one end of a sliding carrier E having its forward portion set at an angle to its rear portion and having its front end part provided with an anti-friction roller $b$ in opposition to the bottom F of the casing of the machine on which a serially recessed plate G is arranged to constitute a guide for the several carriers. Constituting a preferably integral part of each carrier, at the free end of the same, is an upwardly extending standard E', and having a recessed upper part in pivotal connection with the upper recessed end of the same is a coin-pusher 100 opposed to expansive force of a spiral-spring $c$ for which said standard is provided with a socket. As best shown in Fig. 10, the pivot $d$ for each coin-pusher is a pin provided with a flanged head $d'$ and engaging said head against its flange is one end of a spring-plate $e$ fastened at its other end to the adjacent carrier-standard by a screw $f$ engaging said standard, this being an important detail of the machine designed to prevent automatic separation of a coin-pusher from its carrier. It is sufficient that the pushers for the smaller coin have direct contact with the springs in the standards of their carriers, but it is preferred, as shown in Fig. 10, to interpose a shouldered plunger $g$ between each pusher for the larger coin and the adjacent spring to obtain the best results.

The front-plate H of the machine-casing is supported on an angular ledge I of said casing, to which the coin-delivery chute J is fastened, the lower edge of said front plate being provided with guide-notches for the several coin-pushers held down against resistance of the springs $c$ in the standards of their carriers.

All of the rockers D oppose the universal rocker K to which reference is had in the foregoing, the crank-ends of this rocker being pivotally connected to brackets L that are fast on the bottom F of the aforesaid casing. The spring M controlling the universal rocker is suspended under tension in connection with the framework of the machine, and said rocker is longitudinally of said machine.

Centrally secured to the ledge I aforesaid is a spring-bar O provided at its ends with lugs $h$ that extend up through apertures provided in said ledge to oppose the bottom of the removable coin-tray P of the machine, this tray being generally similar to the one disclosed in the patent first aforesaid. The ledge I is provided with dowel-pins $i$ for engagement with sockets in the coin-tray, and said tray is provided with rear upper keepers for cam-latches Q in pivotal connection with the sides R of the machine casing. Each keeper is a pin $j$ crossing a recess in an ear $k$ of the coin-tray frame, and the engagement of a latch Q with said keeper is against resistance of the spring-bar O, whereby the coin-tray is securely held in detachable connection with the casing aforesaid.

Like in the patent first aforesaid, the bottom of the coin-tray is provided with guide-grooves for the coin-pushers of the machine and these pushers are severally indexed as 50, 25, 10, 5, 2, 1 and $. As in the prior art, one of the guide grooves of the coin-tray is made to accommodate paired coin pushers 1 and 2 for which the plate H is correspondingly notched. The usual clearance is provided at the lower end of each compartment of the coin-tray to permit of the expulsion from said compartment of one or more coin by the relative pusher.

Figure 15:
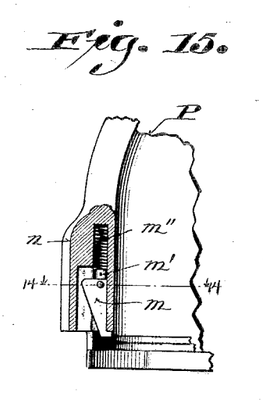
Fig. 15, a side elevation of a detail of the coin-tray partly in section on line 15—15 of Fig. 14, and Fig. 16, a side elevation of another detail of said coin-tray.
Figure 16:
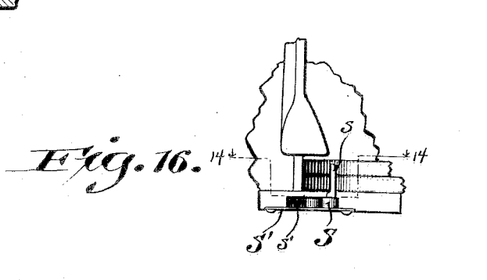

The tray herein shown has compartments for fifty, twenty-five, ten, five and one cent coins, and a single compartment for one dollar coins, and said compartments are indexed 50, 25, 10, 5, 1 and $, there being two compartments 10 and 1, and the paired coin-pushers 1 and 2 aforesaid are relative to a compartment 1 of said tray. To prevent more than one coin being ejected when the pusher 1 of the pair aforesaid has forward thrust, a spring-controlled detent $m$ is pivotally hung in a recess of a rib $n$ of the coin-tray to be in the path of the coin next above the lowermost coin. The detent is best shown in Fig. 15, as having a shank $m'$ engaging a spiral-spring $m''$ under tension in a socket with which the coin-tray rib $n$ is provided, and said detent takes the place of the spring-wire specified in the patent first aforesaid for the same purpose, there being ready yield of the same to pressure of the coin in rear thereof when the pusher 2 of said pair is actuated.

Figure 14:
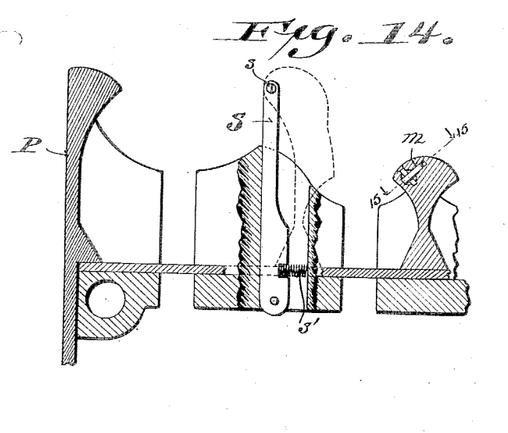
Fig. 14, a horizontal section of a detail of the coin-tray of the machine at different elevations, this view being indicated by line 14—14 in each of Figs. 15 and 16.

The organization of the present machine is such as to provide for the ejectment of two one dollar coins from the $ compartment of the tray each time the $ pusher is actuated, and a spring-controlled detent is provided for holding back the last dollar coin when it occurs that there are three such coin in the tray and the one uppermost tends to move forward with the other two and tilt out of the tray. The dollar-detent is best shown in Fig. 14, as being a tongue S pivoted at one end in an under recess of the bottom of the coin-tray and having a vertical disposed lug $s$ on its exposed outer end, this lug constituting the coin stop. The tongue is provided with a notch with which its controlling spring $s'$ engages, this spring being in opposition to a wall of the play-recess for said tongue. The dollar-detent yields to the passage of two coins, but immediately snaps back in the path of the third coin. The play recess for the dollar-detent is closed at the bottom by a plate S' fastened to the coin-tray, by screws or otherwise, and said detent is pivoted on the plate.

The mechanism for depressing the coin-pusher 50 out of working position consists of a spring-controlled angular bail T having a lateral lug $q$ over against said pusher for which a clearance-groove $r$ is provided in the ledge I, the arms of this bail being guided in the top of the machine-casing and pivotally connected to those of another angular rocker-bail U loose on a rod V for which a supporting yoke V' is provided on the aforesaid casing bottom. One arm of the bail T is extended below its connection with the bail U and the extension is provided with a cam-notch $t$ and a keeper notch $u$ alternately engageable by a spring-controlled latching-rocker W supported in bearings $t'$ on said casing-bottom in the path of the carriers for the fractional coin pushers. The mechanism for depressing the 50 and 25 coin-pushers comprises an angular spring-controlled bail T' having a lateral wing $q'$ over against said pushers, and a clearance groove $p'$ for the pusher 25 is also provided in the aforesaid ledge. The arms of the bail T' are guided in said casing-top and pivotally connected to those of another angular rocking-bail U' loose on the rod V. One arm of the bail T' is extended below its connection with the bail U' and the extension notched similar to the arm-extension of the bail T, and for the same purpose. The controlling springs $v$ of the latching-rocker W are connected to it and the plate G on the aforesaid casing-bottom. The springs X, X', in connection with the bails T, T', respectively, are suspended under tension from inner lugs $w$ of the aforesaid casing-top. When either of the bails T or T' is depressed, the keeper-notch of the arm-extension thereof engages the latching-rocker W, by which it is held until again disengaged by a forward thrust of one or more of the coin-pusher carriers. The automatic latching of either of said bails, in depressed position, leaves both hands of the operator free for other operations of the machine, this being important. It is also to be noted that if the bail T is depressed by mistake for the bail T' or vice versa, the depression of the other bail will effect a release of the one first depressed, the one last depressed being automatically latched in that position.

The coin delivery chute J is of the same general construction as the one in the patent first aforesaid, except that it is walled at the front and provided with a lower central depression having a bottom opening for which a spring-controlled sliding trap-door Y is provided. The underside rear portion of the trap-door is provided with a semi-circular push flange $w$ by which to facilitate the pushing back of said door to permit coin from the delivery-chute to drop into the center of the hand of the operator. A shank $x$ of the trap-door is fast in a longitudinally slotted sleeve Z closed at its rear end by a screw-plug Z'. The sleeve and its slot engage a guide-bracket Z'' fastened to the underside of the bottom of the aforesaid casing, and extending forward from said bracket is a pin $y$ on which the spiral controlling spring $z$ of the trap-door is centered. To deaden noise incidental to reciprocation of the trap-door, a cushion-disk $z'$ is interposed between the guide-bracket Z'' and the sleeve-plug Z, and a similar disk is interposed between the shank $x$ of said door and the forward end of the spring $z$ strikes against the pin $y$.

From the foregoing it is evident that the trap-door of the coin-delivery chute closes automatically, said door being supported and guided in brackets Y' Y'' attached to said chute, and as best shown in Fig. 8, one of these brackets also serves as a guide for an angular sliding stop $b'$ designed to be adjusted into the forward path of the aforesaid trap-door to hold the same in its open position whenever desirable. One side of the stop $b'$ is provided with a pair of indentures and one of the other of the same is engaged by a spring-controlled ball $c'$ to hold said stop in or out of the forward path of the trap-door, the guide-bracket for the aforesaid stop being provided with a barrel $e'$ in which said ball and the spring $f'$ opposed thereto are continued, the spring being under tension. The trap-door being in closed position, the operator of the machine may use both hands to manipulate the keys of said machine, said door being slid back when a change making or paying operation has been effected.

Figure 4:
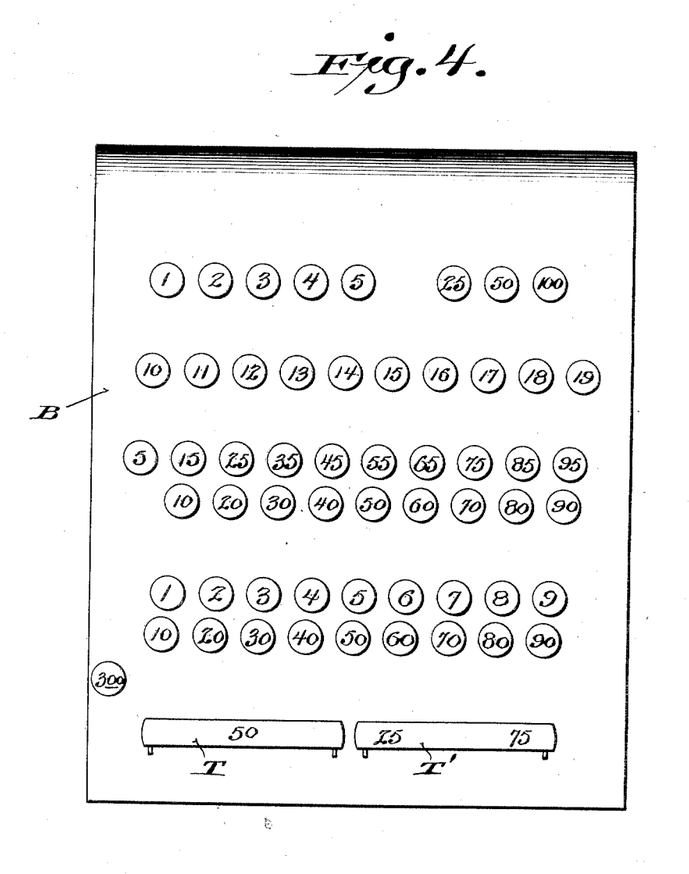
Fig. 4, a plan view of a fragment of the machine illustrating a preferred arrangement of push-keys of the same.
Figure 5:
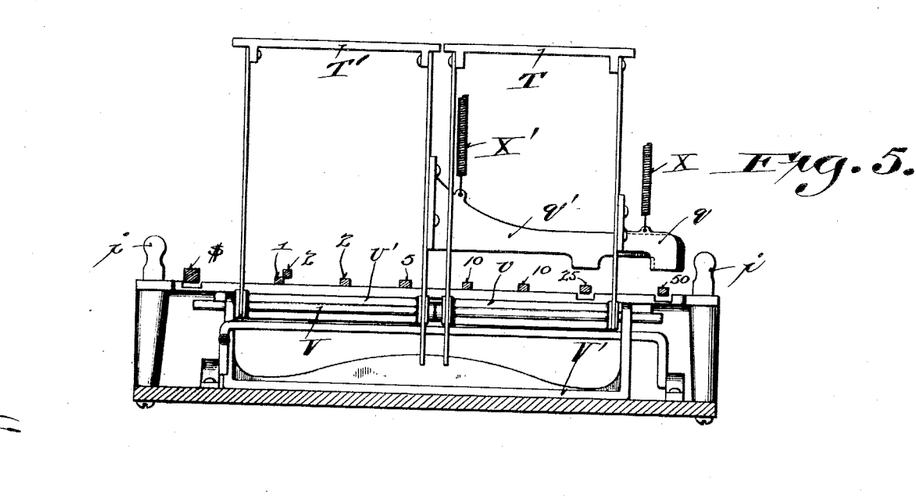
Fig. 5, a transverse section view of the machine, this view being indicated by line 5—5 in each of Figs. 1 and 2.
Figure 6:
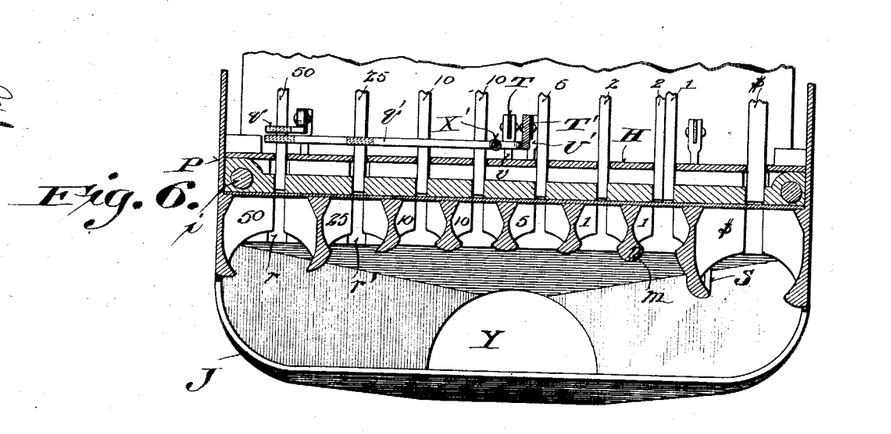
Fig. 6, a horizontal section view of a fragment of the machine, this view being indicated by line 6—6 in Fig. 1.

In Fig. 4, is shown the disposition of the keys of the improved machine, and reading up, the first two rows, contain jointly seventeen keys intended to be operated when change out of a dollar is desired, after a sale involving cents from one to nine or with a larger amount in tens, a tens key and a units key to the amount of the sale being operated. Thus if the sale amounted to eighty-seven cents, the keys 80 and 7 of said two rows would be operated to obtain thirteen cents out of one dollar. In said series of keys the one indexed 90 is a dummy and useful only to avoid confusion when change out of a dollar is required for a sale over ninety cents, the operator mentally going to the dummy tens key and then to the proper units key. The next two rows jointly of but nineteen keys in all are intended for effecting operations to obtain change out of one dollar for sales to the value of five cents or multiples of the same up to ninety-five cents. The next above single row of ten keys are intended for effecting paying operations in amounts from ten to nineteen cents inclusive, and the five keys in the row next above to the left are intended for effecting paying operations in amounts from one to five cents. The three keys in the upper row to the right are intended for effecting paying operations in a variety of coins totaling amounts of twenty-five and fifty cents, and one dollar respectively, and the lower left hand key is intended for paying a sum of three dollars, its operation effecting an ejectment of two one dollar coins, a fifty, twenty-five, two tens and one five cent coin from the tray. To hold back fifty cents out of a dollar when operating a change key or keys, the bail T is depressed and likewise to hold back twenty-five or seventy-five cents the bail T' is depressed.

I claim:

1. A coin-delivery machine comprising a series of rockers, springs by which the rockers are suspended, key and spring controlled push-plates for actuating said rockers singly and associated, coin-pushers, means by which the aforesaid rockers and coin-pushers are connected, a turning member underlying said rockers comprising a pivoted swinging frame and a spring for forcing the frame upward.

2. In a coin delivery machine, the combination with the casing, of a series of reciprocating keys, independent springs arranged to operate respectively the various keys, pusher mechanism operated by the keys, and a spring pressed equalizing bar pivotally supported at its ends and arranged to operate on all of the keys for properly positioning the various keys.

3. In a coin delivery machine, the combination with a series of independently spring actuated keys, of a series of coin pushers operated by the keys, and independent spring actuated means comprising a bar pivotally supported at its opposite ends for properly positioning all the keys.

4. A coin-delivery machine comprising a series of rockers, suspension springs by which the rockers are supported, key and spring controlled push-plates for actuating said rockers singly and associated, a series of rocker-controlled sliding carriers, coin-pushers in connection with the carriers, a spring-controlled rocker underlying those aforesaid and overlying the said carriers.

5. A coin-delivery machine comprising a casing series of rockers, actuating means for the rockers, and a fixed stop extending upwardly from the casing and common to all of said rockers in the downward path of the same.

6. A coin-delivery machine comprising a series of rockers, actuating means for the rockers, and a notched plate arranged to constitute a fixed positive upwardly extending stop common to all of said rockers in the downward path of the same.

7. A coin-delivery machine comprising a series of sliding coin-pusher carriers, means for reciprocating the carriers longitudinally singly and associated, and a serially recessed plate arranged to constitute a guide for the forward ends of the several carriers.

8. A coin-delivery machine comprising a series of sliding carriers each having a standard portion thereof recessed at its upper end, a coin pusher engaging the recess of the standard with which it has pivotal connection, the pivot being a pin having a flanged head, a spring-plate engaging the pin-head against its flange, and means for fastening the spring-plate to said standard.

9. A coin-delivery machine comprising a series of sliding carriers each having a standard portion thereof recessed at its upper end, a coin pusher engaging the recess of the standard with which it has pivotal connection, the pivot being a pin having a flanged head, a spring-plate engaging the pin-head against its flange, and a screw by which the spring-plate is fastened to said standard.

10. A coin-delivery machine having a casing provided with a ledge, a spring-bar centrally secured to said ledge and provided with end lugs extending through the same, a coin-tray detachably mounted on said ledge to bear upon the lugs of the spring-bar, cam-latches in pivotal connection with said casing and keepers on the coin-tray with which the latches engage, the leverage of the latches being against resistance of said spring-bar.

11. A coin-delivery machine having a casing provided with a ledge, a spring-bar centrally secured to said ledge and provided with end lugs extending through the same, dowel pins on said ledge, a coin-tray provided with sockets for said dowel pins and which rests upon said ledge and the lugs of the spring-bar, and cam-latches in pivotal connection with said casing for engagement with keepers with which the coin-tray is provided, the leverage of the latches being against resistance of said spring-bar.

12. A coin-delivery machine having a casing provided with a ledge, a spring-bar centrally secured to said ledge and provided with end lugs extending through the same, a coin-tray having detachably mounted on said ledge to bear upon the lugs of the spring-bar, recessed ears with which the coin-tray is provided, a pin crossing the recess of each ear, and cam-latches in pivotal connection with said casing for engagement with said pins, the leverage of the latches being against resistance of said spring-bar.

13. A coin-delivery machine having a coin-discharge chute thereof provided with a spring-controlled reciprocative trap-door, and an adjustable stop to hold the door in open position.

14. A coin-delivery machine having a coin-discharge chute thereof provided with a spring-controlled reciprocative trap-door, a sliding stop for the door provided with a pair of indentures, and a spring-controlled ball arranged to engage either of said indentures and thereby hold the stop in or out of working position.

15. A coin-delivery machine having a coin-discharge chute thereof provided with a sliding trap-door and guides for the same, a longitudinally slotted sleeve fast on a shank-extension of the door, a stationary guide-bracket engaging the sleeve and its slot, a pin extending forward from the bracket, a spring between the door-shank and guide-bracket, a cushion-disk between the spring and said shank, and another cushion-disk between said guide-bracket and a rear closure with which said sleeve is provided.

16. A coin-delivery machine comprising a series of sliding carriers, means for reciprocating the carriers singly and associated, coin-pushers in conjunction with said carrier, a spring-controlled latching-rocker in the forward path of the aforesaid carriers, and spring-controlled depressors for certain of the coin-pushers each provided with an extension having a cam-notch and a keeper-notch therein for alternate engagement with the latching-rocker.

17. In a coin delivery machine, a coin tray having a rib member formed with a recess therein, a detent pivotally supported in the recess and yielding means engaging the said detent, for the purposes specified.

18. A coin-delivery machine coin-tray having a compartment rib thereof provided with a vertically disposed recess and socket, a coin-detent pivotally hung in said recess, and a spring under tension in said socket engaging a shank with which said detent is provided.

19. A coin-delivery machine coin-tray having the bottom thereof provided with an underside recess, a coin-stop consisting of a tongue pivoted at one end in said recess and provided at its other exposed end with a vertically disposed lug, and a spring interposed between the tongue and a wall of the aforesaid recess.

20. In a coin delivering mechanism, the combination with a series of spring actuated keys, a series of reciprocating coin pushers, and a series of rockers for operating the pushers, of a bar arranged below all of the rockers and having horizontal end extensions, pivotal connections for the end extensions, and a suspending spring connected with the said end extensions.

21. In a coin delivery machine, the combination with a series of spring actuated keys, of a series of rockers operable by the keys, springs for normally retaining the rockers in an operative position, push rod carriers operated by the rockers, coin pushers on the carriers, and a spring operated bar common to all the rockers arranged below the same and above the said carriers.

22. In a coin delivery machine, the combination with a series of keys, a series of rockers associated with the keys, springs for maintaining rockers and keys in operative position, reciprocating carriers pivotally connected with the rockers and extending forwardly therefrom, upstanding parts on the ends of the carriers, and pivoted spring pressed coin pushers connected with said upstanding parts and extending forwardly beyond the carriers for maintaining the forward end of the carriers in their proper position against vertical movement.

23. In a coin delivery machine, the combination with keys and spring operated rockers associated therewith, of forwardly extending carriers having their forward ends arranged at an angle to the rear portions thereof, means connecting the same with the rockers whereby the forward end of the carriers will have a reciprocating movement, anti-friction surfaces at the forward ends of the carriers, and spring pressed pushers carried by the rockers.

24. In a coin delivery machine, the combination with keys and associated spring controlled rockers, of carriers having their rear ends pivotally connected with the rockers and having their free forward ends positioned adjacent the front of the machine, pushers carried by the forward ends of the carriers and adapted to maintain the carriers in position against vertical movement, and means for guiding the forward ends of the carriers in their reciprocating movement.

25. In a coin delivery machine, the combination with coin delivering instrumentalities comprising reciprocating coin pushers, of means for rendering certain pushers inoperative, said means comprising reciprocating members having parts projecting over said pushers, guide link connections for said means, and means releasable by the pusher mechanism for retaining said means in operative position.

26. In a coin delivery machine, the combination with coin delivery instrumentalities comprising pushers, of a plurality of bails having offset portions arranged above the pushers, the upper ends of the bails extending above the machine, links connecting the lower ends of the bails, and means for locking the bails in their lowered position.

27. In a coin delivery machine, the combination with a series of coin pushers and means for operating the same, of mechanisms for rendering inoperative certain pushers comprising reciprocating members, spring actuated means for engaging the members and retaining them in their lowered position, and mechanism operable by the pusher actuating mechanism for releasing the members from the locked position.

28. In a coin delivery machine, the combination with a series of coin pushers and mechanism for operating the same, of reciprocating members having projections for rendering inoperative certain pushers, links connecting the said members to the machine, means for locking the members in their lowered position, and means for releasing the lock upon the operation of the pusher mechanism.

29. In a coin delivery machine, the combination with the frame of the machine and a coin tray located thereon, pivoted latches for retaining the tray in position, and yielding means for normally pressing the tray in the direction of the latches.

30. In a coin delivery machine, the combination with a casing, of a coin tray removably supported on the front thereof, means for locking the tray in position, and yielding means for forcing the tray upward toward the locking means.

31. In a coin delivery machine, the combination with a casing, of a removably spring-supported coin tray located thereon, and pivoted latches for securing the tray in position.

32. In a coin delivery machine, the combination with delivering instrumentalities, and a coin receiving chute having a discharge opening therein, of a spring actuated reciprocating slide for the opening, and a push flange located adjacent the rear of the slide back of the center of the opening when the slide is in its normal position.

33. In a coin delivery machine, the combination with delivering instrumentalities and a coin receiving chute having a discharge opening, means for holding the slide in an open position therein, of a spring actuated reciprocating slide for the opening and a curved finger-pushing flange located adjacent the rear of the slide.

34. In a coin delivery machine, the combination with a coin discharge chute provided with a reciprocating trap door, an extension on the rear of the door, a stop, a latch for holding the door open and a spring on said extension.

35. In a coin delivery machine, the combination with a coin discharge chute, of a reciprocating closure therefor, an extension on the rear of the closure, guides for the closure, a fixed abutment associated with said extension, and an inclosed spring interposed between the abutment and the closure.

36. In a coin delivery machine, the combination with a coin discharge chute, of a closure therefor, extensions connected with the closure and projecting rearwardly thereof, guides for the closure, a stop for limiting the movement of the closure, and inclosed yielding means for normally forcing the closure into operative position.

37. In a coin delivery machine, the combination with a coin chute having a discharge opening, a reciprocating closure for the opening, guides for the closure, a rod member extending rearwardly from the closure, a fixed member on the machine, a spring interposed between said fixed member and the said closure and a closure for the spring.

In testimony that I claim the foregoing I have hereunto set my hand at New York, in the county of New York and State of New York in the presence of two witnesses.

EDWARD J. BRANDT.

Witnesses:
FRANK L. McKENNA,
EDWIN PALMER SMITH.